Patented Apr. 29, 1924.

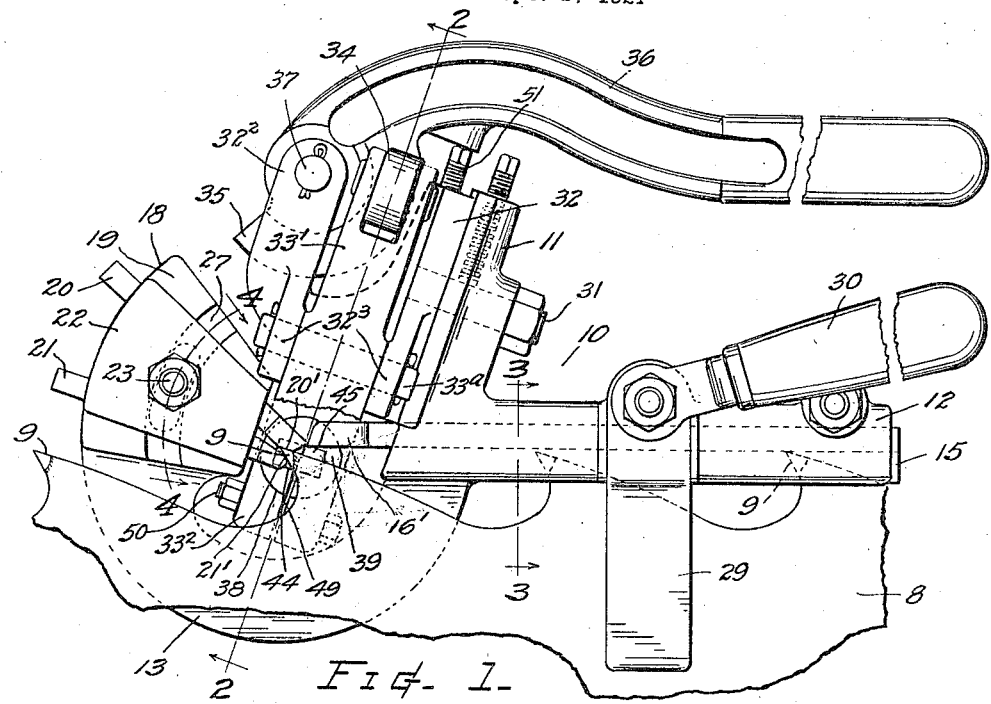

1,492,093

UNITED STATES PATENT OFFICE.

WALTER C. BARNHART, OF SEATTLE, WASHINGTON.

SWAGED SAW-TOOTH SHAPER.

Application filed September 1, 1921. Serial No. 497,490.

*To all whom it may concern:*

Be it known that I, WALTER C. BARNHART, a citizen of the United States, residing at Seattle, in the county of King and State of Washington, have invented certain new and useful Improvements in Swaged Saw-Tooth Shapers, of which the following is a specification.

This invention relates to saw-tooth shaping devices such as used for treating swaged teeth to produce side clearance thereto.

The object of my invention is the improvement of devices of this character to insure greater uniformity to the teeth and be otherwise more efficient.

Other objects and advantages of the invention will appear in the following specification.

The invention consists in the novel construction, arrangement and combination of parts hereinafter described and claimed.

In the accompanying drawings,—

Figure 1 is side elevation, partly broken away, of the improved shaper applied to a saw. Figs. 2, 3 and 4 are sectional views through 2—2, 3—3 and 4—4 of Fig. 1. Fig. 5 is a sectional view taken substantially through 5—5 of Fig. 2. Fig. 6 is a perspective view of one of the tooth shaping dies; and Fig. 7 is a perspective view of a die holder shown detached.

Referring to the drawings, 8 represents a saw having swaged teeth 9 which are to be shaped at opposite sides.

10 represents generally the frame or body of my device comprising a post member 11 extending upwardly from an end of a bar member 12 and above a side element of a substantially U-shaped member 13. Said frame is preferably, though not necessarily, composed of an integral casting.

The frame bar member 12 is provided in its underside with a groove 14 to receive removable side plates 15 and a bar 16 arranged as shown in Fig. 3 to afford a recess 17 to accommodate the saw teeth 9. The bar 16 extends beyond the bar member 12 as a relatively narrow finger $16^1$ into the opening between the limbs of the frame member 13.

The outer limb 18 of the frame member 13 is provided with a plane side surface 19 against which are secured work positioning bars 20 and 21 by means of a clamping block 22 and a bolt 23.

The block 22 is provided in its side next to the frame with recesses 24 and 25 (Fig. 4) for holding said positioning bars in the relative angular relations with each other in which they are represented in Fig. 1.

At their inner ends said positioning bars are provided with bevel surfaces $20^1$ and $21^1$ to engage the upper and lower surfaces of a saw tooth for locating the device to shape the side faces of such tooth.

In order to regulate said positioning bars to suit saws with different inclinations of teeth, the block 22 is provided with tongue elements 26 (Fig. 4) engaged in an arcuate guideway 27 provided in the frame part 18 and a slot 28 is provided in the latter for the clamping bolt 23.

29 represents spring metal arms depending from the frame member 12 to engage a saw blade 8 at opposite sides for maintaining the device in upright position on a saw. A handle 30 is advantageously secured to the frame member 12 for moving the device to present the bars 20 and 21 to a saw tooth. In such shifting of the device the bar finger $16^1$ temporarily resting on a tooth serves to direct the device so that a tooth point will be guided into the angle between the beveled ends of the positioning bars 20 and 21. Mounted for vertical movements on the post 11 and secured in adjusted positions thereto by means of a screw 31 is a body 32 having at its lower end a forwardly projecting portion $32^1$ (Fig. 2) which terminates in upwardly extending standard elements, such as $32^2$. Said body is also provided at opposite sides with apertured lugs $32^3$ to which companion levers 33 are fulcrumed by means of pins $33^a$. The upper arms $33^1$ of these levers carry rollers 34 which engage against cam surfaces 35 provided on an operating lever 36 which is fulcrumed by a pin 37 to standards $32^2$.

The lower arms $33^2$ of the levers 33 are bored transversely of the device to afford sockets 38 for cylindrical barrels 39. These barrels bear respectively against plugs 40 having peripheral flanges 41 which, in turn, bear against annular seats 42 provided at the outer ends of the sockets.

As best shown in Figs. 5 and 7, a barrel 39 is provided with a rectangular aperture 43 extending its entire length and in which are fitted in side by side relations a tooth shaping die 44 and a stop 45. The die and stop of each barrel abut against set screws 46 and 47 which are individually adjustable in threaded holes provided in the respective plugs 40.

The barrels 39 and lever arms 33² are each slotted as denoted respectively by 48 and 49 so that the said dies and stops may be rigidly cramped in the barrels by drawing toward each other complementary parts of the lever arms at opposite sides of the slots 49 by means of bolts 50.

51 represents an adjustable stop for limiting the effective movement of the operating lever 36 to regulate the influence of the cam elements thereof on the dies 44 and stops 45 with respect to the work.

After the teeth of a saw have been swaged my shaping device is applied to a saw by having the grooved bar member 12 of the shaper frame straddle the saw as shown in Figs. 1 and 3. Thus supported on a saw, the frame is positioned with respect to a tooth by engaging the latter between the bevel surfaces 20¹ and 21¹ (see Fig. 1) of the positioning bars 20 and 21. The lever 36 is then operated to actuate through the medium of its cam elements 35 the companion levers 33 whereby the dies 44 and the stops 45 are respectively brought against the sides of the swaged portion of the tooth and the adjacent plane thereof. In such action the bevel parts 44¹ of the die ends serve to shape both sides of the tooth points to a suitable clearance and to similar extents by reason of the stops 45 regulating the positions of the dies laterally of the saw when the stops mutually encounter the tooth. The dies 44 and stops 45 are adjusted longitudinally thereof and with respect to each other by means of the respective set screws 46 and 47, and may be rotatably adjusted by rotatably regulating the barrels 39 in the sockets therefor of the levers 33. The rotary adjustment of the dies are of importance as it enables the same to be set to bevel the teeth to predetermined angles for producing both back and under clearances, so called, to the teeth as may be desired. Another important feature of the invention is the provision of devices, comprising body 32 and the screw 31, whereby the levers 33 may be vertically moved to present the dies 44 at predetermined elevations with reference to the saw teeth.

The arrangement and location of the positioning bars 20 and 21 are also important features of the invention inasmuch as they not only locate the device to present the dies in register with a tooth, but also are adjustable to teeth having different angular relations with respect to a saw blade.

What I claim, is,—

1. In a saw-tooth shaper of the character described, the combination of a pair of companion levers, transversely disposed saw-tooth shaping dies carried by the respective levers and arranged for longitudinal and rotary adjustments therein, means for securing each of said dies in both its longitudinal and rotary positions in the respective lever, a transversely disposed stop provided for each of said dies, means for regulating the positions of said stops to engage a saw-blade for limiting the action of said dies with respect to a saw-tooth, and means for operating said levers.

2. In a saw-tooth shaper of the character described, the combination with the shaper frame, saw-tooth shaping dies movable transversely of said frame, and means to actuate said dies, two bars provided on the frame and engageable with the saw-tooth to be operated upon for regulating the positions of said dies with respect to the saw-tooth, and means for adjusting the angular positions of both of said bars with respect to the axes of said dies.

3. In a saw-tooth shaper of the character described, the combination with the frame, of a pair of companion levers adjustably movable vertically of the frame, barrel members rotatably mounted in corresponding arms of the respective levers, a saw-tooth shaping die and a saw-blade engaging bar provided in each of said barrels, means for independently adjusting the positions of said dies and bars axially of the respective barrels, and means to actuate said levers to render said dies and bars operable.

4. In a saw-tooth shaper of the character described, the combination of a pair of companion levers, barrel members rotatably mounted in the respective levers, a saw-tooth shaping die and a saw-blade stop bar provided in side by side relations in the respective barrels, means for regulating the positions of said dies and bars with respect to each other, and means to actuate said levers to effect the operation of the dies.

5. In a saw-tooth shaper of the character described, the combination with the frame, saw-tooth shaping dies, and means for operating said dies in unison, saw-tooth engaging bars provided on said frame for positioning the dies with respect to the work, said bars being disposed in angular relations with respect to each other, said bars being individually adjustable longitudinally thereof, means for securing said bars in such adjusted positions to said frame, said last named means being adjustably connected with the frame for coincidently regulating the angular positions of both of said bars with respect to the saw-tooth to be operated on.

6. In a saw-tooth shaper of the character described, the combination with a frame having a recess to receive a saw, of a body connected for vertical adjustments to said frame, companion levers carried by said body, transversely arranged slotted barrel members rotatably mounted in arms of said levers, a saw-tooth shaping die and a saw-blade engaging stop provided in the slot of each of said barrels, means carried by the respective levers for adjusting the positions of said dies and the saw-blade stop independently of each other, and a hand lever carried by said body and provided with cam elements for actuating said levers to operate said dies.

7. In a saw-tooth shaper of the character described, the combination with a frame having a recess to receive a saw, of independently adjustable bars engageable with the saw-tooth operated on for positioning the shaper with reference thereto, a body connected for vertical adjustments to said frame, companion levers carried by said body, transversely arranged slotted barrel members rotatably mounted in arms of said levers, a saw-tooth shaping die and a saw-blade engaging stop provided in the slot of each of said barrels, means carried by the respective levers for adjusting the positions of said dies and the saw-blade stop independently of each other, and means for actuating said levers to operate said dies.

8. In a saw-tooth shaper of the character described, the combination with a frame having a recess to receive a saw, of independently adjustable bars engageable with the saw-tooth operated on for positioning the shaper with reference thereto, companion levers carried by said frame, transversely arranged slotted barrel members rotatably mounted in arms of said levers, a saw-tooth shaping die and a saw-blade engaging stop provided in the slot of each of said barrels, means carried by the respective levers for adjusting the positions of said dies and the saw-blade stop independently of each other, and means for actuating said levers to operate said dies.

9. In a saw-tooth shaper of the character described, the combination with a frame having a recess to receive a saw, of independently adjustable bars engageable with the saw-tooth operated on for positioning the shaper with reference thereto, a body connected for vertical adjustments to said frame, companion levers carried by said body, transversely arranged slotted barrel members rotatably mounted in arms of said levers, a saw-tooth shaping die and a saw-blade engaging stop provided in the slot of each of said barrels, means carried by the respective levers for adjusting the positions of said dies and the saw-blade stop independently of each other, and a hand lever carried by said body and provided with cam elements for actuating said levers to operate said dies.

10. In a saw-tooth shaper of the character described, the combination with a frame having a recess to receive a saw, of a body connected for vertical adjustments to said frame, companion levers carried by said body, transversely arranged slotted barrel members rotatably mounted in arms of said levers, a saw-tooth shaping die and a saw-blade engaging stop provided in the slot of each of said barrels, means carried by the respective levers for adjusting the positions of said dies and the saw-blade stops independently of each other, and means for actuating said levers to operate said dies.

Signed at Seattle, Washington, this 26th day of August, 1921.

WALTER C. BARNHART.

Witnesses:
PIERRE BARNES,
MARGARET G. SUPPLE.